United States Patent [19]

Sontheimer

[11] Patent Number: 4,623,097
[45] Date of Patent: Nov. 18, 1986

[54] CONVENIENT FEEDTUBE PROTECTOR AND SINGLE-MOTION COVER LIFTING STRUCTURE FOR A FOOD PROCESSOR

[76] Inventor: Carl G. Sontheimer, 14 Gray Oaks La., Greenwich, Conn. 06830

[21] Appl. No.: 239,317

[22] Filed: Mar. 2, 1981

[51] Int. Cl.[4] .............................................. B02C 18/12
[52] U.S. Cl. ................................. 241/37.5; 241/282.1
[58] Field of Search ............ 241/36, 37.5, 92, 199.12, 241/282.1, 282.2

[56] References Cited

U.S. PATENT DOCUMENTS 2,169,323  8/1939  Martinet .................... 241/37.5 X
4,226,373 10/1980  Williams ...................... 241/37.5

Primary Examiner—Mark Rosenbaum
Attorney, Agent, or Firm—Parmelee, Bollinger & Bramblett

[57] ABSTRACT

A convenient feedtube protector and single-motion cover lifting structure is provided for a food processor of the type including a housing containing an electric motor drive and control means for rendering the motor drive inoperative unless the control means are actuated. The food processor can be actuated when and only when both the cover and the feedtube protector are properly positioned, such that the control means become actuated to permit operation of the motor drive, thereby preventing inadvertent insertion of a hand or foreign object through the feedtube while the tool is being driven. The feedtube protector and the cover are separate items, and therefore the normal procedure for removing the cover from the bowl is to remove the feedtube protector first and set it down on a counter and then to remove the cover. In accordance with the present invention, a lateral access opening is provided in the outer sleeve of the feedtube protector for exposing the feedtube to the grasp of the user. Accordingly, when the protector is grasped with the thumb on one side and with the fingers on the other, either the thumb or the fingers press directly through the lateral access opening onto the feedtube. Thus, when the hand is raised, the cover is automatically and simultaneously lifted together with the feedtube protector in a single, convenient motion using one hand.

8 Claims, 6 Drawing Figures

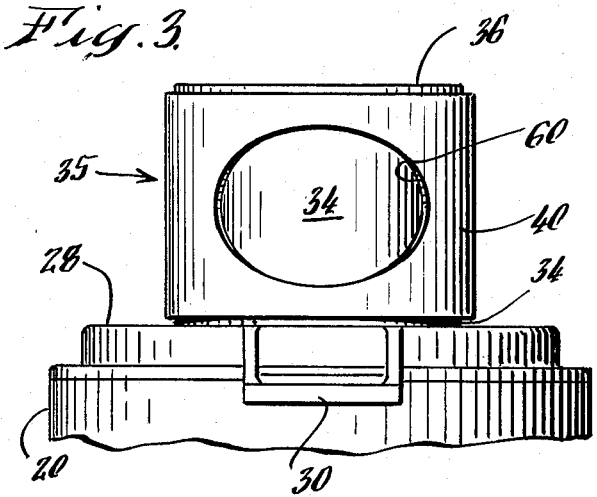
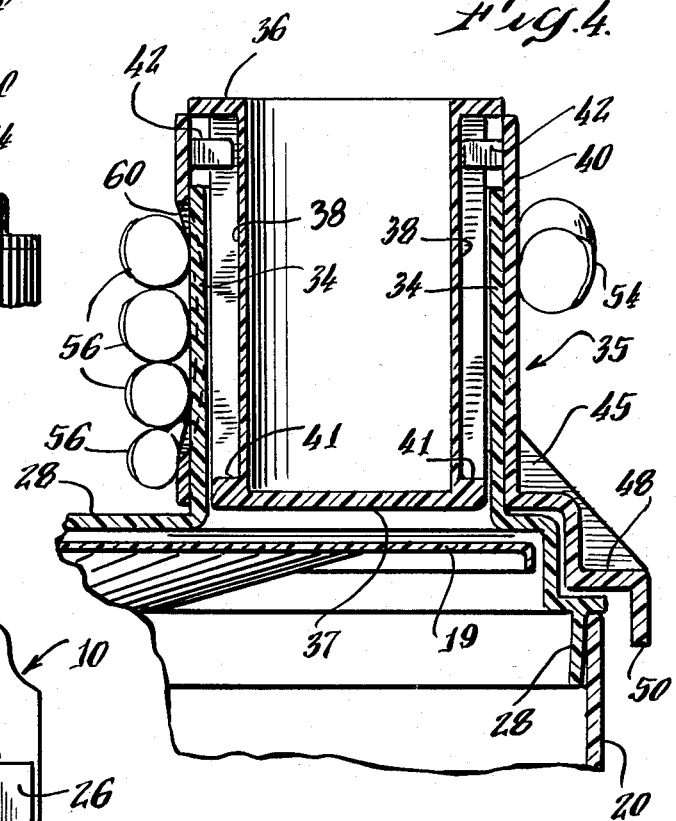
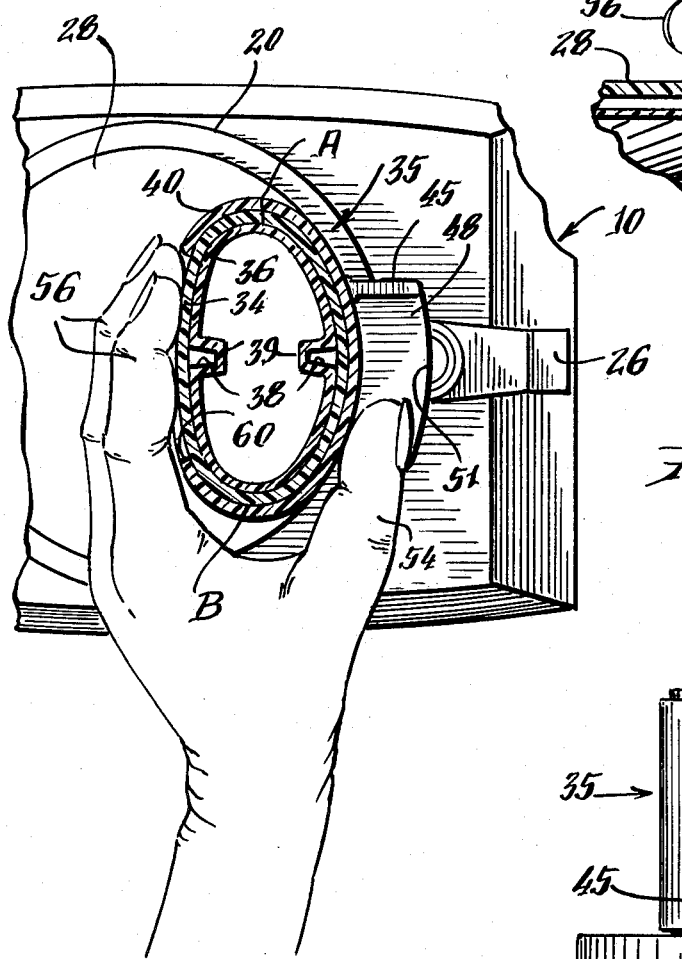
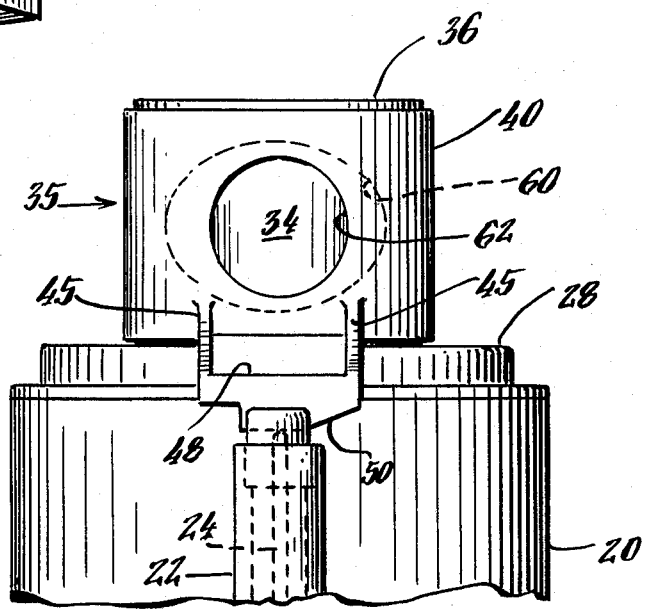

CONVENIENT FEEDTUBE PROTECTOR AND SINGLE-MOTION COVER LIFTING STRUCTURE FOR A FOOD PROCESSOR

BACKGROUND OF THE INVENTION

This invention relates to food processors of the type having a feedtube protector which must be properly inserted on a cover and manually operated by the user of the food processor in order to enable the operation of the food processor. This invention provides a convenient feedtube protector and single-motion cover lifting structure which advantageously enables the simultaneous removal of the cover and feedtube protector in a single motion using one hand.

The present invention is applicable to food processors of the type having a working bowl with motor driven tool drive means extending into the bowl with which various selected rotary food processing tools can be engaged to be driven for performing various food processing operations in accordance with the desires of the user. A removable cover is secured over the top of the bowl during use. The cover includes a feedtube having a passage way which opens downwardly through the cover into the top of the bowl, and food items to be processed are placed in the feedtube and then pushed down into the bowl by means of a removable food pusher which is adapted to slide down in the manner of a plunger in the feedtube. The food items are sliced, grated, or otherwise processed, by the rotary tool in the top of the bowl.

Additional information with respect to such food processors may be had by reference to U.S. Pat. Nos. 3,985,304—Sontheimer; 4,198,887—Williams; 4,200,244—Sontheimer; 4,216,917—Claire and Sontheimer; 4,213,570—Jones; and 4,227,655—Williams.

Of particular interest to the present invention is U.S. Pat. No. 4,226,373, entitled "Feedtube Protector For a Food Processor". The feedtube protector has an outer sleeve carrying an actuator thereon and a movable food pusher mounted for movement within the interior of this outer sleeve. The outer sleeve is nestable over the feedtube with the food pusher being aligned with and manually movable as a plunger within the passageway of the feedtube. When the cover is properly positioned on the bowl and the feedtube protector is properly positioned on the feedtube, then the actuator becomes operably associated in enabling relationship with the control means in the housing to permit operation of the motor drive, thereby preventing the inadvertent insertion of a hand or a foreign object into the feedtube when the rotary tool is being driven by the motor drive. With the protector in place on the feedtube, the food pusher may be used to feed food items which are to be processed toward the rotary tool. The food processor cannot be operated without first properly positioning the feedtube protector fully nested over the feedtube. Since the food pusher becomes directly aligned in blocking relationship with the passageway of the feedtube before the motor drive can be energized, it is not possible inadvertently to insert a hand or a foreign object through the feedtube into the food processor while the food processor is being operated. Among the advantage of the aforesaid feedtube protector are those resulting from the fact that the cross-sectional area of the food passageway and the feedtube can be made relatively large, as may be desired, so that larger food items can be inserted whole into the food processor. Also, as a result, the entire machine can safely be scaled up to larger sizes by enlarging the covered bowl and feedtube without endangering the user.

As described in detail in said Pat. No. 4,226,373 the feedtube protector and the cover are separate items. Therefore, the normal procedure for removing the cover from the bowl is first to remove the protector and set it down on a counter in one motion of the user's hand and then to remove the cover and set it down on the counter in a second motion of the hand.

SUMMARY OF THE INVENTION

It is among the advantages of the present invention that it provides a new and improved feedtube protector which may be removed by one hand together with the cover; so that both the protector and cover are simultaneously conveniently removed from the bowl and can be set down together on a counter in one motion by one hand.

An object of this invention is to provide a new and improved feedtube protector which is more convenient to use with the separate cover and which does not detract from the safety provided by using the feedtube protector.

In carrying out this invention in one illustrative embodiment thereof a convenient feedtube protector and single-motion cover lifting structure is provided for use in a food processor of the type having an upright working bowl for enclosing a rotary cutting tool and motor-driven means for rotating the tool within the bowl with a removable cover adapted to be secured on the bowl and having a feedtube for feeding food items to the rotary tool within the bowl. The feedtube protector has an actuator thereon and has a movable food pusher in telescoping relationship. The protector is mountable over the feedtube, with the food pusher becoming aligned with and manually movable as a plunger within the feedtube. When the cover is properly positioned on the bowl and the feedtube protector is properly positioned on the feedtube, then the actuator of the feedtube protector becomes operatively associated in enabling relationship with the control means in the housing to permit operation of the motor drive means. The feedtube protector and cover lifting structure of the present invention comprises at least one lateral access opening in the outer sleeve of the feedtube protector for exposing the feedtube to the grasp of the user such that the feedtube protector together with the cover may be removed from the bowl using one hand to simultaneously grasp both the outer sleeve of the feedtube protector and the feedtube on the bowl. Thus, the user can conveniently simultaneously remove both the cover and the feedtube protector from the bowl and set them down together on a counter in a single motion.

As a result of the single-motion feedtube protector and cover lifting structure of the present invention, a convenient method for simultaneous removal of the feedtube protector and cover is provided, while maintaining the safety provided by the feedtube protector.

BRIEF DESCRIPTION OF THE DRAWINGS

The invention, together with further objects, features, aspects and advantages of the invention will be more fully understood from a consideration of the following description taken in conjunction with the accompanying drawings in which like reference numbers indicated like parts throughout the various views.

FIG. 3 is an elevational view of the top portion of FIG. 2 as seen from the direction 3—3 in FIG. 2;

FIG. 4 is an elevational sectional view taken along line 4—4 of FIG. 1 illustrating the feedtube protector and the feedtube being grasped simultaneously by one hand of the user;

FIG. 5 is a plan view, similar to FIG. 1, with a cross section being taken through the feedtube and protector being simultaneously grasped by one hand of the user; and FIG. 6 is an elevational view of the top portion of the food processor illustrating another embodiment of the present invention.

DESCRIPTION OF THE PREFERRED EMBODIMENTS

Figure 1:
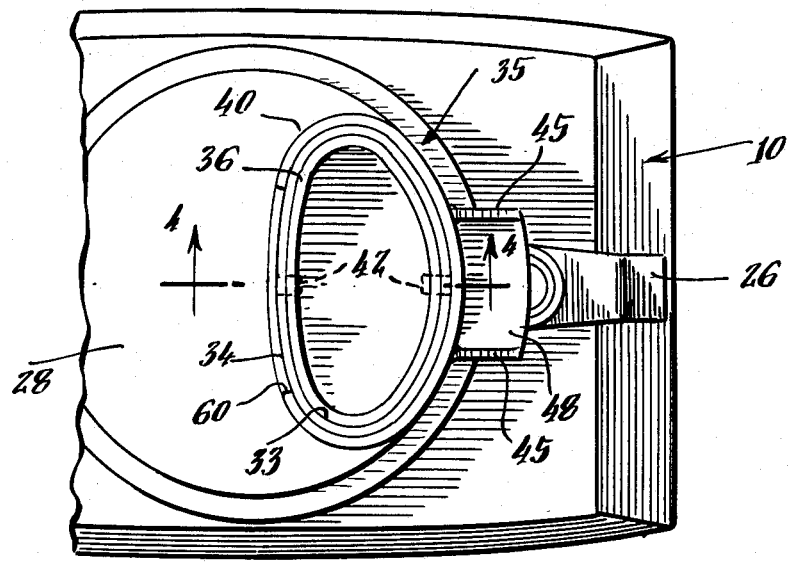
FIG. 1 is a partial top view of a food processor with a feedtube protector embodying the invention.
Figure 2:
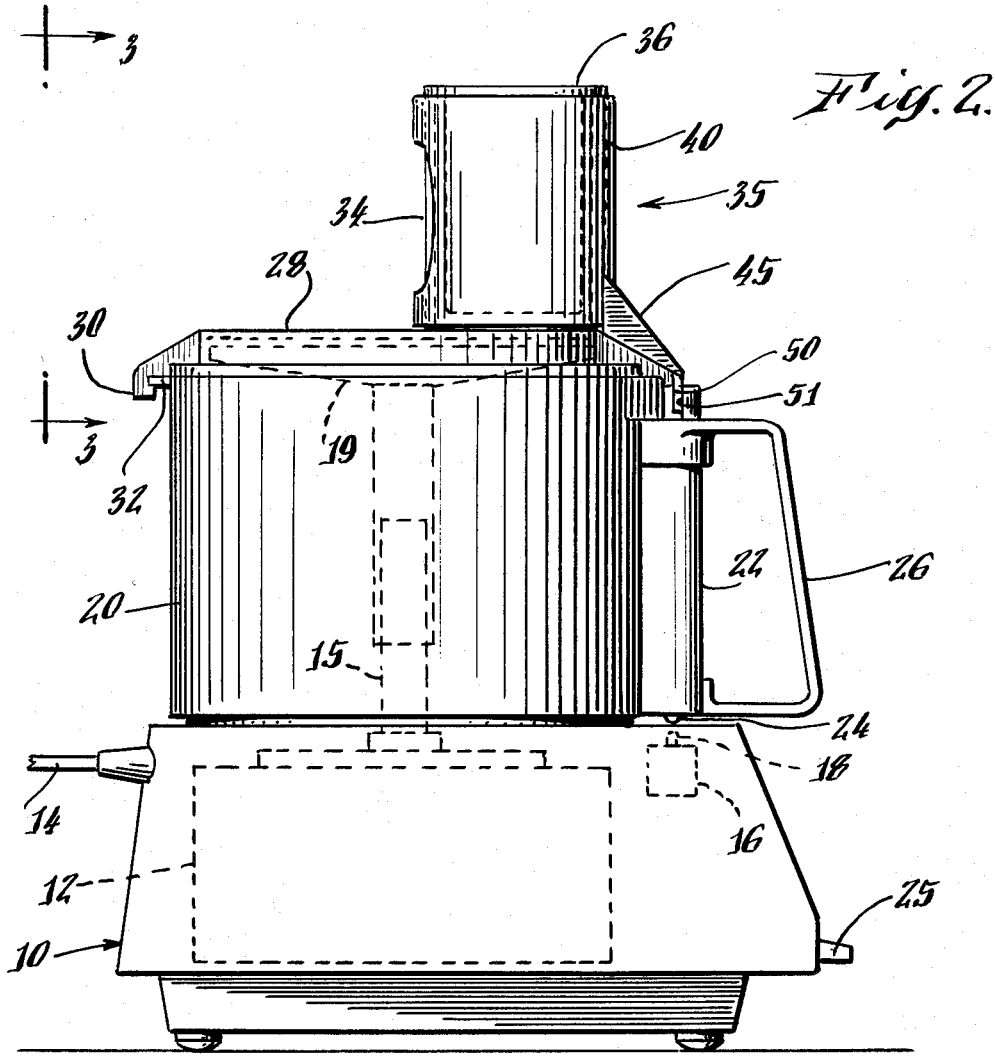
FIG. 2 is a side elevational view of the food processor shown in FIG. 1.

Referring now to FIGS. 1 and 2, a food processor is illustrated having a base housing 10 containing an electrical motor 12 which is energized by power cord 14 via a switch 16 having a vertically movable actuating button 18.

The motor 12 has a vertical drive shaft 15 which extends upward from the base housing 10, and a working bowl 20 is mountable on the housing 10 surrounding the tool drive shaft 15. A variety of different types of food processing tools, one of which is illustrated at 19, may be selectively mounted on the drive shaft 15 for rotation therewith within the bowl, for performing a wide variety of food processing operations, as may be desired by the user.

In order to prevent inadvertent operation of the food processor 10, there is a vertical semi-cylindrical boss 22 formed on the side of the bowl 20 defining a guideway in which is carried a vertically movable operating rod 24 normally urged upwardly by means of a spring (not shown). When the bowl 20 is properly positioned on the housing 10, the operating rod 24 becomes aligned with the actuation button 18 of switch 16. Therefore, when the operating rod 24 is depressed, the switch 16 becomes actuated, for enabling the motor 12 to drive the rotary tool 19 within the bowl 20, whenever a control lever 25 (FIG. 2) is actuated by the user. A handle 26 is provided on the bowl 20.

The top of the bowl 20 is closed by a cover 28 which is arranged to be engaged in secured relationship on the bowl in its normal operating position before the food processor is placed in operation. The cover 28 may be held in secured engagement on the bowl 20 by placing the cover on the rim of the bowl and turning the cover to obtain a twist-lock effect. One way of obtaining such locking engagement as illustrated in FIG. 2 is to provide the cover 28 with a plurality of circumferentially located depending lugs 30 which, upon the rotation of the cover, engage beneath a plurality of cooperating radial ledges 32 on the bowl 20 near its rim. The apparatus which has been described is conventional and is illustrated in the aforesaid patents.

The cover 28 has an upright feedtube 34 defining a passageway 33 which extends downwardly through the cover for accommodating food items which are to be processed. The food items are manually placed in the feedtube for being pushed by a plunger to be described later into contact with the rotary tool 19 in the bowl 20.

Associated with the feedtube 34 is a removable feedtube protector referred to generally by the reference character 35, which is similar in structure to that disclosed and claimed in U.S. Pat. No. 4,226,373 referred to above. The feedtube protector 35 includes an outer sleeve 40 having the same general configuration but being slightly larger than the feedtube 34. This outer sleeve 40 is adapted to nest down around the exterior of the feedtube 34 in a close fitting but easily slidable relationship.

Near the top of this outer sleeve 40 are a plurality of guide means 42 (see FIG. 4) in the form of inwardly projecting elements such as tongues, lugs or splines which are rigidly secured to the outer sleeve 40 and on which a food pusher or plunger 36 is slidably mounted in captivated relationship. The food pusher 36 has a plurality of longitudinally extending guideways 38 therein which are engaged in sliding relationship with the respective guide elements 42. Therefore, the food pusher 36 can be moved longitudinally in telescoping relationship with respect to the outer sleeve 40, but the pusher cannot be completely removed from it.

These longitudinal guideways may be in the form of channels or grooves provided by internal U-shaped bosses 39 (FIG. 5) extending vertically along the side surface of the food pusher 36, or may be in the form of slots in the sides of the pusher 36. The guide means 42 may also serve as stop means for limiting the downward travel of the pusher so that it will not strike the tool 19, or other stop means may be provided, for example, stops or flanges located at the top of the pusher may be used, if desired. The guideways 38, 39 and the guide means 42 are shown located on opposite sides of the narrowest region of the feedtube. In the event that a smaller diameter food feed passageway is provided within the plunger, then it is preferred to locate the guideways 38, 39 and guide means 42 on opposite sides of the widest region of the feedtube, i.e. near A and B in FIG. 5.

By virtue of the fact that the guideways 38 are blocked at their lower ends, the food pusher is permanently captured with respect to the outer sleeve 40 and cannot be completely extracted from this sleeve. The pusher can be withdrawn from the sleeve 40 until the blocking portions 41 abut against the guide means 42, at which point the bottom 37 of the pusher is near the top of the feed tube. The outer sleeve 40 thus carries the food pusher 36 for slidable movement therein by the guide means 42 in engagement with the guideways 38 and which permit the food pusher 36 to be moved vertically within the outer sleeve 40.

The exterior of the food pusher 36 has a configuration matching with the passageway 33 formed by the feedtube 34 but is slightly smaller. Thus, when the outer sleeve 40 is telescoped over the exterior of the feedtube 34, the food pusher 36 becomes positioned in alignment with the passageway 33 for plunger action within the feedtube.

The outer sleeve 40 has an annular flange 48 projecting therefrom along one side at a lower elevation, as will be seen in FIG. 6. This flange 48 is provided with additional support by upwardly extending stiffening ribs 45 secured to the sleeve 40. The flange 45 carries an actuator 50 in the form of a cam extending downwardly therefrom which is adapted to mate into a slotted structure 51 at the top of the boss 22 in order to engage the upper end of the rod 24 for depressing this rod for closing the switch 16. An example of such feedtube protector structure is shown and claimed in the aforesaid U.S. Pat. No. 4,226,373.

In operation, the cover 28 is placed on the rim of the bowl 20 and is locked in place by turning it to cause the depending lugs 30 on the cover to engage the cooperating radial ledges 32 on the bowl 20 to obtain a twist-lock effect with the protector sleeve 40 fully nested down around the feedtube 34. When the cover 28 is thus mounted on the bowl 20 with the depending lugs locked in position under the radial ledges and with the protector sleeve 40 fully nested down around the feedtube, then the flange 48 and actuator cam 50 are aligned with the operating rod 22 for depressing this rod for closing the switch 14, enabling the motor drive to be energized by the user's operation of the control lever 25 (FIG. 2).

The food pusher 36 is positioned in alignment with the passageway 33 of the feedtube and is able to be moved manually downwardly into contact with the food items to be processed; so that its bottom surface 37 (FIG. 4) can push the food items down onto the rotating tool 19.

Once the food has been processed and the cover is to be removed, the feedtube protector 35 is first removed and set down on a counter. Then, secondly, the cover 28 is disengaged from the radial ledges 32 by turning the cover relative to the bowl and is lifted to set it down on the counter. This removal procedure which is normal for the feedtube protector as shown in U.S. Pat. No. 4,226,373 involves two sequential operations to remove the feedtube protector and then the cover.

In accordance with the present invention, a lateral access opening 60 is provided in the outer sleeve 40 of the feedtube protector 35. This lateral access opening 60 is preferably located on the inside region of the sleeve 40, namely, on the side of this sleeve facing over the central portion of the cover 28 as will be understood from FIG. 2. The purpose of this opening 60 in the outer sleeve 40 is to expose a portion of the outer surface of the feedtube 34. Accordingly, when the protector 35 is grasped by the hand of the user, as is shown in FIGS. 4 and 5, the thumb 54 presses on the outer sleeve 40 while one or more of the fingers 56 extend through the opening 60 and press directly on the feedtube 34. In such a hand position, the cover is conveniently unlocked by manually applying a twisting force to the protector 35 and feedtube 34. Immediately after turning the cover to disengage it from the bowl, the cover can be simultaneously raised along with the feedtube protector 35 by utilizing the one hand in the position as shown with one easy lifting motion. Thus, both the feedtube protector and cover can be set together on a counter.

This one hand and one motion cover removal action is of extreme convenience to the user. Moreover, the safety which has been incorporated in the structure by requiring the feedtube protector 35 to be nested and properly positioned on the bowl in order to actuate the tool drive are not compromised by the lateral access opening 60. As seen in FIG. 4, the sidewall of the feedtube 34 blocks the user's fingers or thumb or any foreign object from entering the food passageway 33. Therefore, the lateral opening 60 does not permit inadvertent contact by the user with the rotating tool 19. Also, the food pusher 36 prevents the user from inadvertent insertion of fingers or a foreign object down through the top of the food passageway 33.

The outer sleeve 40 of the feedtube protector 35 may be gripped with either hand as may be desired by the user. It will be understood that when the outer sleeve 40 is gripped by the right hand in the opposite direction from that shown in FIG. 5, then once again the fingers will be located in the region of the lateral access opening 60 in which case the fingers will naturally grasp the outer surface of the feedtube 34 producing a similar result as with the left hand and enabling the simultaneous removal of the feedtube protector 35 and the cover 28.

Although the particular size and shape of the opening 60 is not critical, the opening is preferably large enough in the vertical direction as illustrated in FIGS. 3 and 4 to accommodate a three-finger grasp of the feedtube and long enough in the horizontal direction so that the finger tips and first jointed sections of three fingers will readily come into firm contact with the outer surface of the feedtube.

It will be understood that all that is necessary is for the opening 60 to be sufficiently large for one finger or a thumb to be able to fit through the opening 60 for grasping the feedtube 34 in order to provide the simultaneous removal function. However, a relatively large opening, for example, of oval shape, is convenient because it assures that a firm, natural grasp on both the protector and feedtube is achieved without special effort by the user.

As illustrated in FIG. 3, the positioning of the opening 60 is preferably along the longer curved side of the outer sleeve 40 which fits over the corresponding longer curved side of the feedtube. As is illustrated in FIG. 6, a slightly different size and shape and a somewhat smaller opening 62 is illustrated on the side of the outer sleeve 40 facing the outside periphery of the bowl 20. This particular configuration using the opening 62 positioned, as shown in FIG. 6, would be more convenient for grasping with the thumb of the user, such that the thumb would project through the opening 62 and bear upon the feedtube with the fingers grasping the wall of the outer sleeve 40 on the opposite side of the feedtube protector from the opening 62. Although more than one opening may be provided and spaced at different positions along the outer sleeve, a single opening is preferable and its positioning on the sleeve facing the central portion of the cover 28 is preferred, as is illustrated in FIG. 3.

It will be understood that the user, if desired, may spread the fingers apart so that the fingers straddle above and below the opening 60. Thus, the fingers do not grip the feed tube, and the feedtube protector 35 can then be lifted completely off from the cover, while the cover remains on the bowl, for exposing the feed passageway 35 for loading food items into this passageway.

Thus, the opening 60 in the location as shown in FIGS. 3-6 enables the user conveniently to locate the fingers for simultaneous removal of protector and cover or alternatively for removal of the protector 35 separate from the cover.

Similarly, by placing the thumb on the protector sleeve 40 above the opening 62 the user can grasp the sleeve without also grasping the feedtube for removal of the protector 35 separate from the cover.

By providing an opening which exposes the feedtube on the cover to the grasp of the user, the feedtube protector and cover may be simultaneously removed utilizing one hand and accomplished in one motion. This is convenient and does not compromise or detract from the safety provided by the feedtube protector.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

I claim:

1. A convenient feedtube protector and cover lifting structure for a food processor of the type including a base containing an electric motor drive and having control meand for rendering said motor drive inoperative unless actuation of said control means occurs, a bowl mountable on said base for surrounding a rotary tool adapted to be driven by said electric motor drive and a removable cover for said bowl with a feedtube mounted thereon forming a passageway for feeding tube items through said cover into said bowl with a feedtube protector including an outer sleeve nestable in a predetermined position around the exterior of said feedtube carrying a food pusher captured in telescoping relationship with respect to said outer sleeve so that the pusher can be plunged longitudinally into said passageway for pushing food items toward the rotary tool in said bowl, said control means being acutated for rendering said motor drive operative when and only when said cover is properly positioned on said bowl and said feedtube protector is nested in said predetermined position around said feedtube, said convenient feedtube protector and cover lifting structure comprising: said outer sleeve of the feedtube protector having a lateral access opening therein for exposing a portion of the feedtube to the grasp of the user, such that said feedtube protector as well as the cover may be removed from the bowl using one hand to simultaneously grasp both the outer sleeve of the feedtube protector and the feedtube itself through said lateral access opening, thereby enabling simultaneous removal of both the feedtube protector and the cover from the bowl in a single motion using one hand.

2. The convenient feedtube protector and cover lifting structure as set forth in claim 1, in which: said lateral access opening is positioned on said outer sleeve on the side thereof facing over the central portion of said cover when said outer sleeve of said feed tube protector is nested in proper operating position around said feedtube.

3. The convenient feedtube protector and cover lifting structure as set forth in claim 1 or 2, in which: said lateral access opening has a sufficient vertical extent for enabling three fingers of a user in side-by-side relationship to grasp the outer surface of the feedtube around which said sleeve is nested and has a sufficient horizontal extent for enabling at least the three finger tips and the first jointed segments of the three fingers to grasp said outer surface of the feedtube.

4. The convenient feedtube protector and cover lifting structure as set forth in claim 3, in which: said lateral access opening has an oval shape as seen in elevation.

5. For use with a food processor having a bowl and a removable cover including a feedtube secured to the cover with a passageway in the feedtube for feeding food items through the feedtube into the bowl when the cover is in operating position on the bowl for processing of the food items by a motor-driven rotary tool in the bowl, a convenient feedtube protector having an outer sleeve nestable about the feedtube in an operating position with a food pusher permanently retained by said sleeve and movable axially with respect to said sleeve for pushing the food items down in said passageway when said sleeve is so nested around said feedtube, said outer sleeve having a lateral access opening therein for exposing a portion of the feedtube to the grasp of the user for said feedtube protector and the cover to be removed simultaneously from the bowl using one hand to grasp both the outer sleeve of the feedtube protector and the feedtube itself through said lateral access opening, thereby enabling simultaneous removal of both the feedtube protector and the cover from the bowl in a single motion using one hand.

6. For use with a food processor, the convenient feedtube protector as claimed in claim 5, in which: said lateral access opening is positioned in said outer sleeve on the side thereof facing over the central portion of said cover when said outer sleeve of said feed tube protector is nested in operating position around said feedtube.

7. For use with a food processor, the convenient feedtube protector as claimed in claim 5 or 6, in which: said lateral access opening has a sufficient vertical extent for enabling at least three fingers of a user in side-by-side relationship to grasp the outer surface of the feedtube around which said sleeve is nested and has a sufficient horizontal extent for enabling at least the three finger tips and also the first joined segments of the three fingers to grasp said outer surface of the feedtube.

8. For use with a food processor, the convenient feedtube as claimed in claim 5 or 6, in which: said lateral access opening has an oval shape as seen in elevation.

* * * * *